(12) United States Patent
Shaw et al.

(10) Patent No.: US 7,706,847 B1
(45) Date of Patent: Apr. 27, 2010

(54) PORTABLE RADIO TELEPHONE

(75) Inventors: Conway Robert Shaw, Berkshire (GB); Guy Arthur Durham, Hampshire (GB); Nigel David Tout, Surrey (GB); Arnold David Gocool, Surrey (GB); Sean Prior, Richmond (GB); Elie Abi Chaaya, Surrey (GB); Guy Alexander Hooker, New Plymouth (NZ)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/074,093

(22) Filed: May 7, 1998

(30) Foreign Application Priority Data

May 9, 1997 (GB) .................................. 9709468.4

(51) Int. Cl.
*H04M 1/00* (2006.01)

(52) U.S. Cl. .................................... 455/575.1; 343/882

(58) Field of Classification Search ................. 455/550, 455/90, 575, 89, 25, 562.1, 575.7; 343/702
See application file for complete search history.

(56) References Cited

U.S. PATENT DOCUMENTS

| | | | |
|---|---|---|---|
| 4,998,078 A | 3/1991 | Hulkko | 333/109 |
| 5,341,149 A | 8/1994 | Valimaa et al. | 343/895 |
| 5,559,522 A * | 9/1996 | Seitz | 343/702 |
| 5,561,439 A | 10/1996 | Moilanen | 343/846 |
| 5,590,416 A * | 12/1996 | Rydbeck | 455/90 |
| 5,617,106 A | 4/1997 | Tahmassebpur | 343/702 |
| 5,627,550 A | 5/1997 | Sanad | 343/700 |
| 5,630,211 A * | 5/1997 | Nagai | 455/89 |
| 5,657,028 A | 8/1997 | Sanad | 343/700 |
| 5,680,144 A | 10/1997 | Sanad | 343/700 |
| 5,706,332 A * | 1/1998 | Nagai | 455/89 |
| 5,850,612 A * | 12/1998 | Kulberg et al. | 455/575.7 |
| 5,909,653 A * | 6/1999 | Imura et al. | 455/575.7 |

FOREIGN PATENT DOCUMENTS

| | | |
|---|---|---|
| EP | 0516490 A2 | 12/1992 |
| EP | 0611199 A1 | 8/1994 |
| EP | 0652646 A1 | 5/1995 |
| EP | 0661825 A1 | 7/1995 |
| EP | 0 675 562 | 10/1995 |
| EP | 0694985 A1 | 1/1996 |
| EP | 0 771 046 | 5/1997 |
| GB | 2018033 A * | 1/1979 |
| GB | 2 018 033 | 10/1979 |
| GB | 2 292 638 | 2/1996 |
| JP | 07307607 | 11/1995 |
| JP | 095051218 | 2/1997 |
| WO | WO 96/27914 | 9/1996 |

* cited by examiner

*Primary Examiner*—Tu X Nguyen
(74) *Attorney, Agent, or Firm*—Perman & Green LLP

(57) ABSTRACT

A portable radio telephone having an antenna projecting from the top surface. The antenna can be pivoted from an upright position to an angled position.

25 Claims, 11 Drawing Sheets

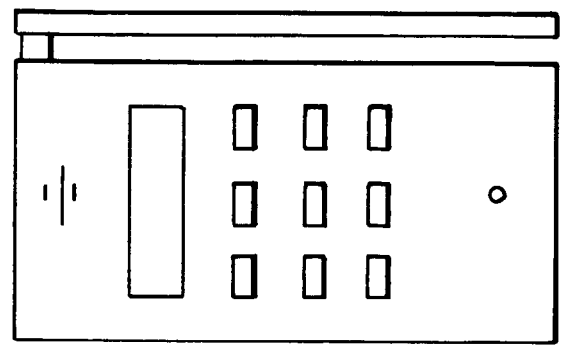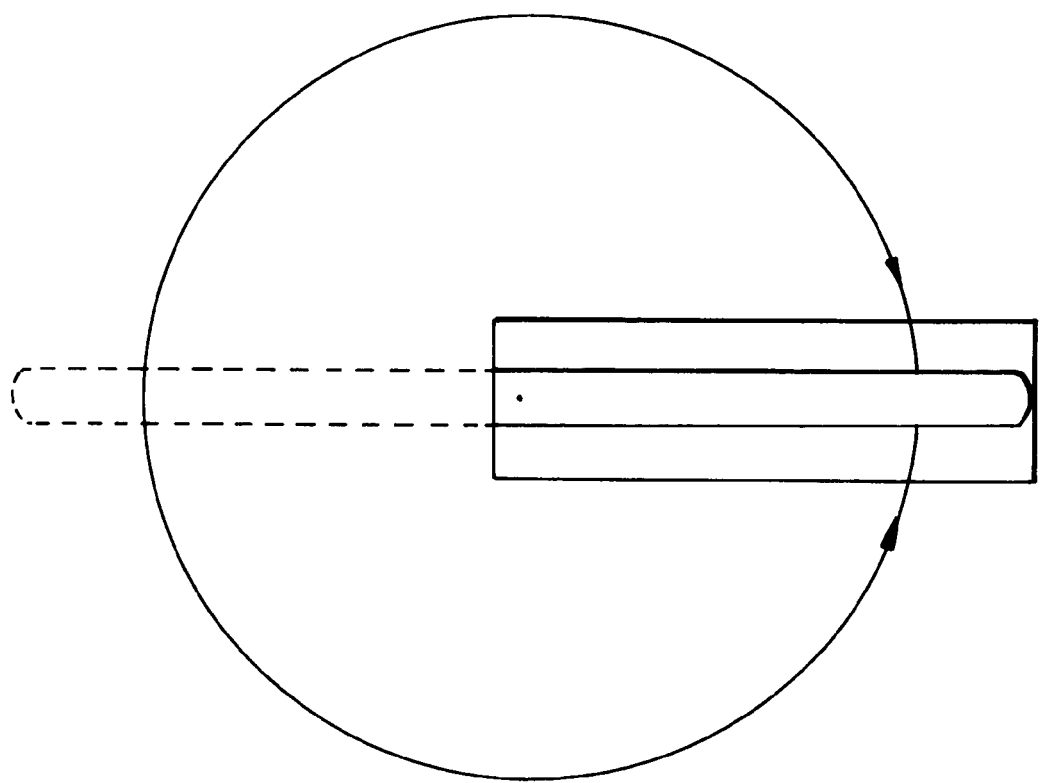
Fig.1.

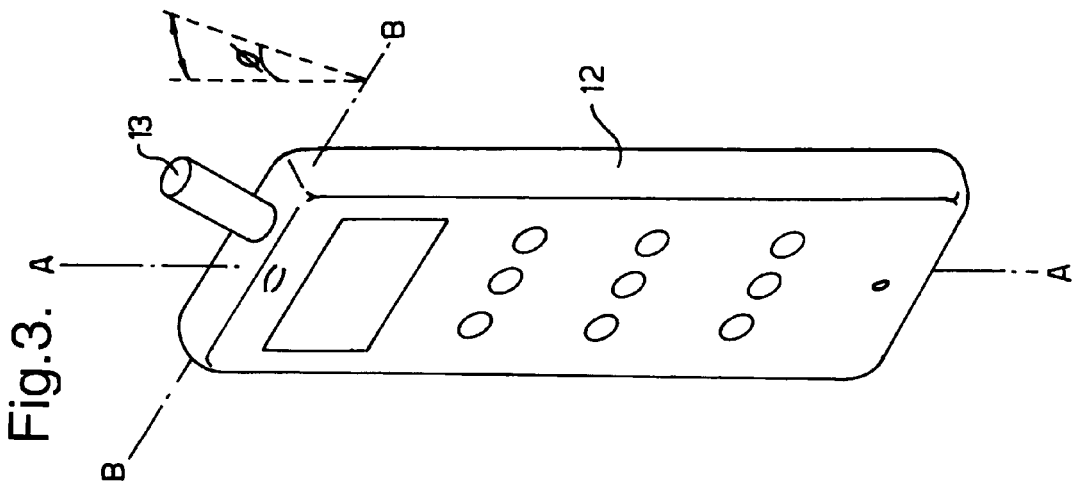
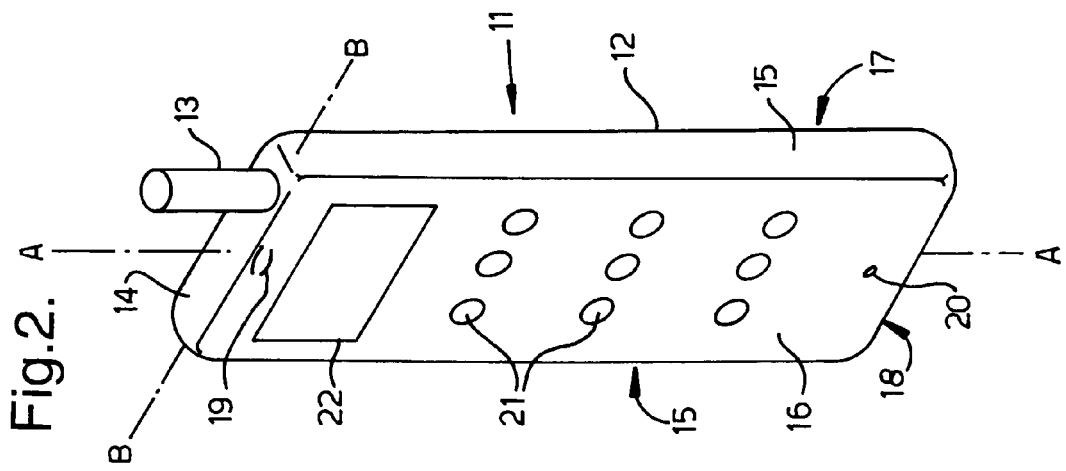

Fig.5a.
Fig.5b.
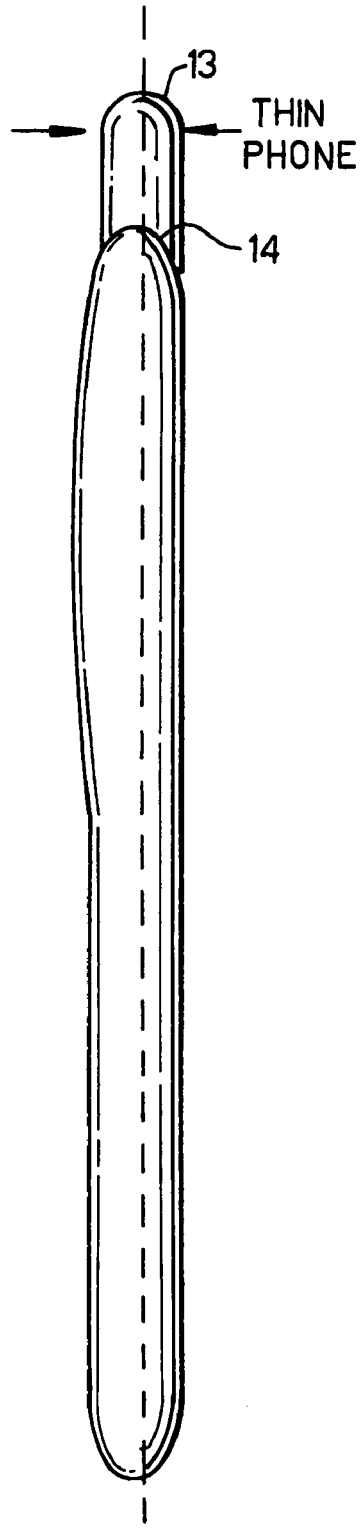
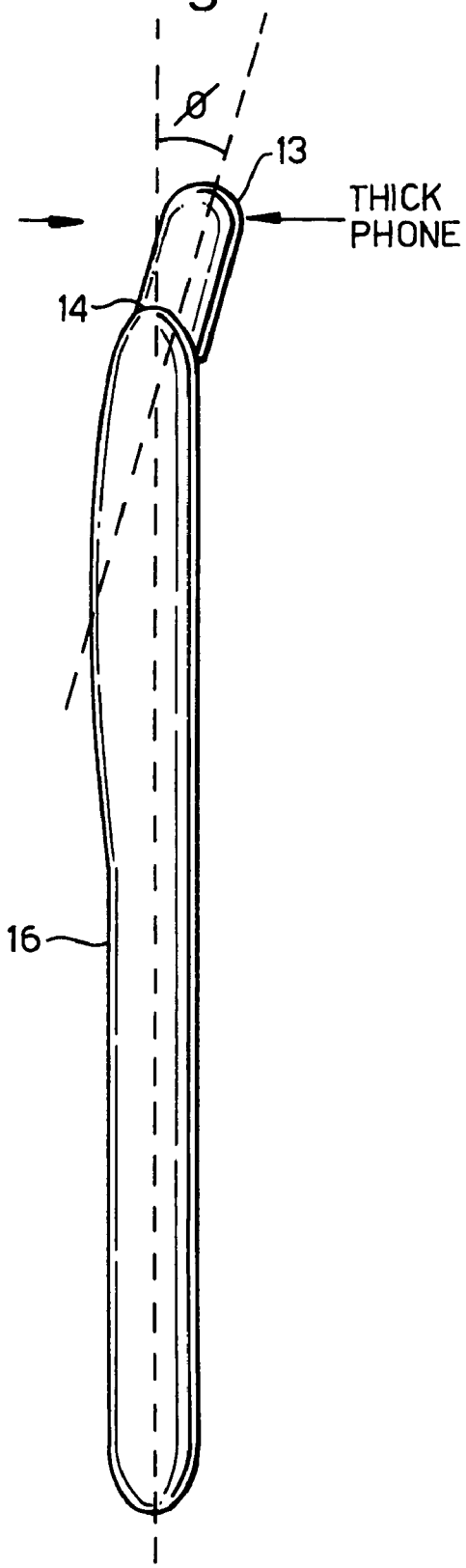

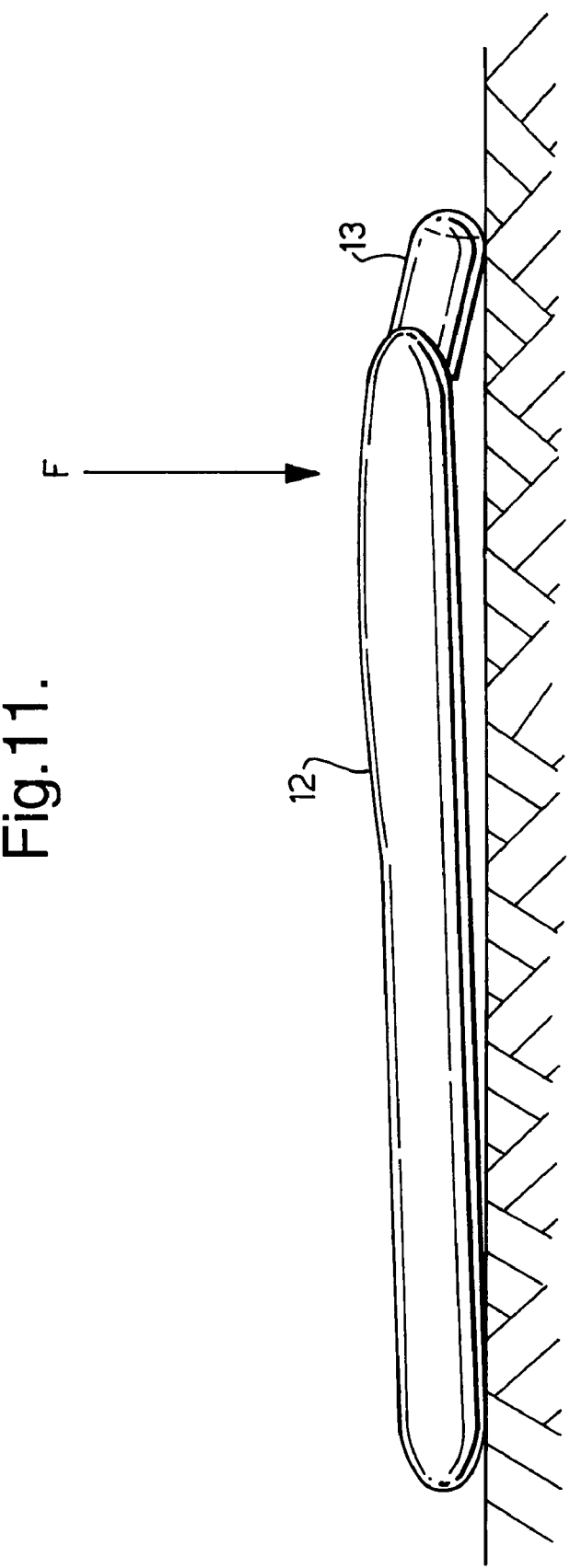

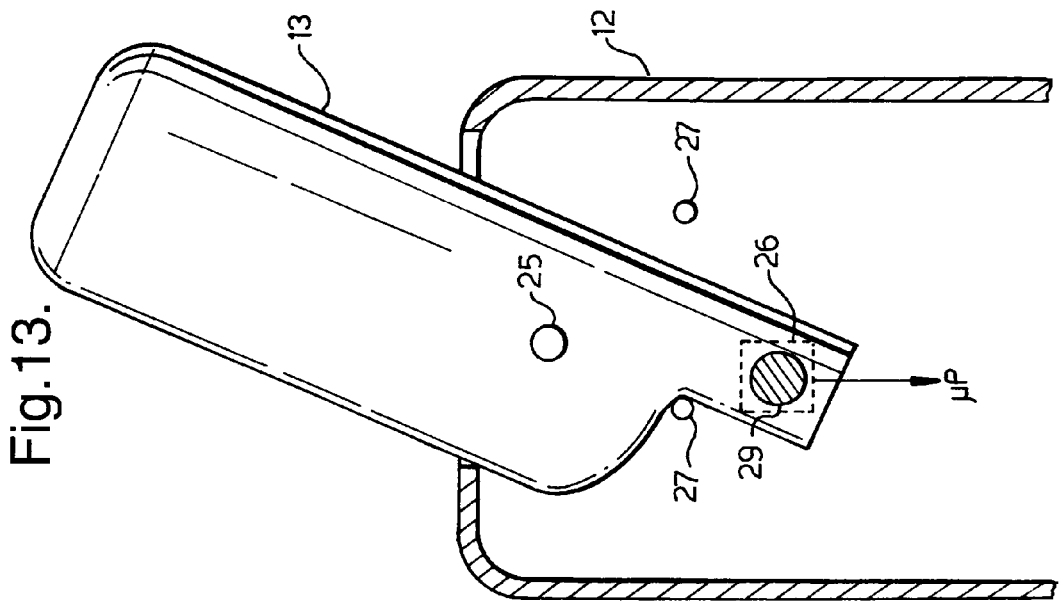
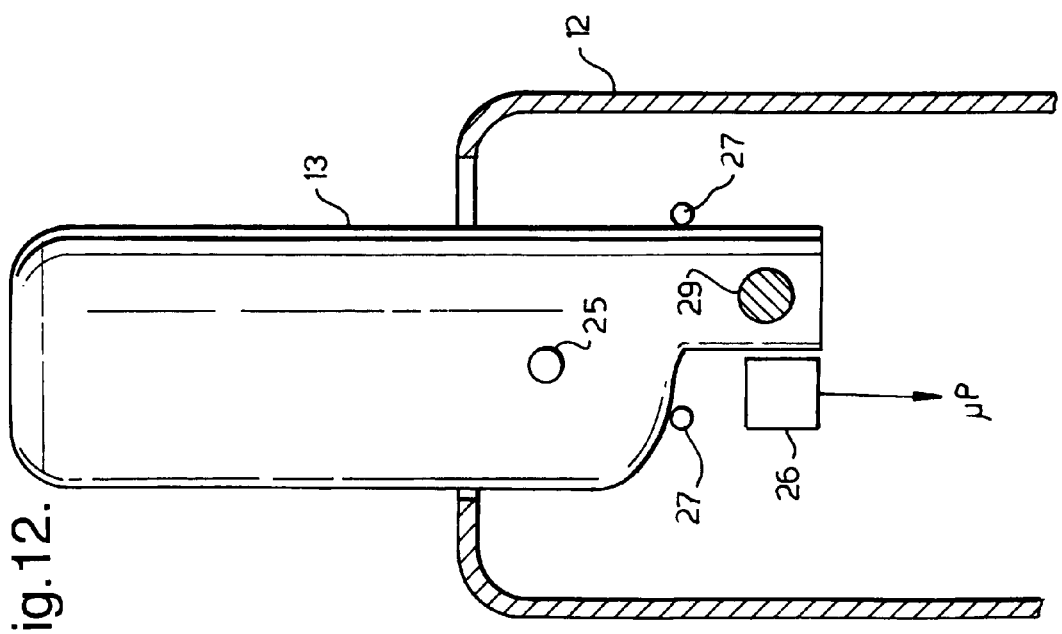

PORTABLE RADIO TELEPHONE

BACKGROUND OF THE INVENTION

The present invention relates to a portable radio telephone having a projecting antenna. The portable radio telephone may, for example, be a radio telephone such as a conventional handheld cellular telephone, or it may be a so-called smart radio telephone or personal organiser having radio frequency (RF) communication capabilities.

A handheld cellular telephone generally includes an antenna for transmitting and receiving radio frequency signals. Some handheld cellular telephones have antennas which are movable, for example, between retracted and extended positions.

European patent publication EP 0 516 490 shows an example of a movable antenna for a portable cellular radio telephone, in the form of a whip antenna which may be extended out of the housing of the portable telephone, or retracted into the housing of the portable telephone.

The Ericsson EH97 handheld cellular telephone shows another example of a movable antenna. Here the movable antenna is in the form of a rod antenna joined to the side of the cellular telephone housing so that it may rotate through 360 degrees. The antenna can be rotated manually by a user between a retracted position and an extended position (see FIG. 1).

SUMMARY OF THE INVENTION

According to the present invention there is provided a portable radio telephone having an antenna which can be pivoted between a first position in which it projects from a surface of the telephone, and a second position in which it projects from a surface of the telephone, whereby the antenna may only pivot in a single plane and through an acute angle.

A portable radio telephone in accordance with the invention may have an advantage that the antenna can be moved to a first position ideal for making voice calls and to a second position ideal for storing the telephone in a pocket or placing on a flat surface. Preferably, in this second position the profile of the radio telephone is minimised.

The antenna of the portable radio telephone projects from a surface of the telephone housing in both the first position and the second position. Thus a user can easily pivot the antenna from the first position to the second position or vice versa.

Having the antenna projecting from the surface of the telephone housing in both the first position and the second position may also improve performance of the antenna by providing a better radiation pattern compared to an antenna not projecting from a surface.

The antenna may be pivotable to one or more stable positions, preferably two stable positions. The antenna may also be biased towards and/or releasably locked in the stable positions.

Ideally in a first stable position the antenna is generally upright and in a second position the antenna is generally slanted, angled or canted relative to the main body of the telephone.

A user of the telephone may have the antenna of the telephone in the upright position most of the time. However, when a call is received by the telephone the antenna may be manually or automatically pivoted to the angled position for the duration of the call. Equally when the user initiates a call the antenna may be manually or automatically pivoted to the angled position for the duration of the call.

In a preferred embodiment the surface which the antenna projects from is an end surface of the telephone. Ideally the surface is a top surface of the telephone.

Preferably the antenna is a helical antenna which may be substantially axially symmetric.

The shape of the antenna may be cylindrical, or it may be conical.

In a preferred embodiment the antenna is attached to the telephone by a hinge arrangement which ensures that the antenna only pivots through an acute angle and in a single plane.

BRIEF DESCRIPTION OF THE DRAWINGS

Embodiments of the invention will now be described, by way of example, with reference to the accompanying drawings, in which:

FIG. 1 is a side and front view of the Ericsson EH97 cellular telephone discussed in the introduction;

FIG. 2 is a perspective view of a radio telephone in accordance with the invention with the antenna in a upright position;

FIG. 3 is a perspective view of the radio telephone of FIG. 2 with the antenna pivoted to an angled position.

FIG. 5a is a side view of a radio telephone in accordance with the invention with the antenna in a upright position;

FIG. 5b is a side view of the radio telephone of FIG. 4a with the antenna pivoted to an angled position.

FIG. 11 is a side view of the radio telephone of FIG. 4b when placed on a surface;

FIG. 12 is cross-sectional view of a portion of a radio telephone in accordance with the invention, with the antenna in the upright position;

FIG. 13 is cross-sectional view of a portion of the radio telephone of FIG. 12, with the antenna pivoted to an angled position;

DETAILED DESCRIPTION OF THE INVENTION

Referring to FIG. 2, there is shown a portable radio telephone 1 consisting of a main body portion 12 and an antenna 13.

Figure 4:
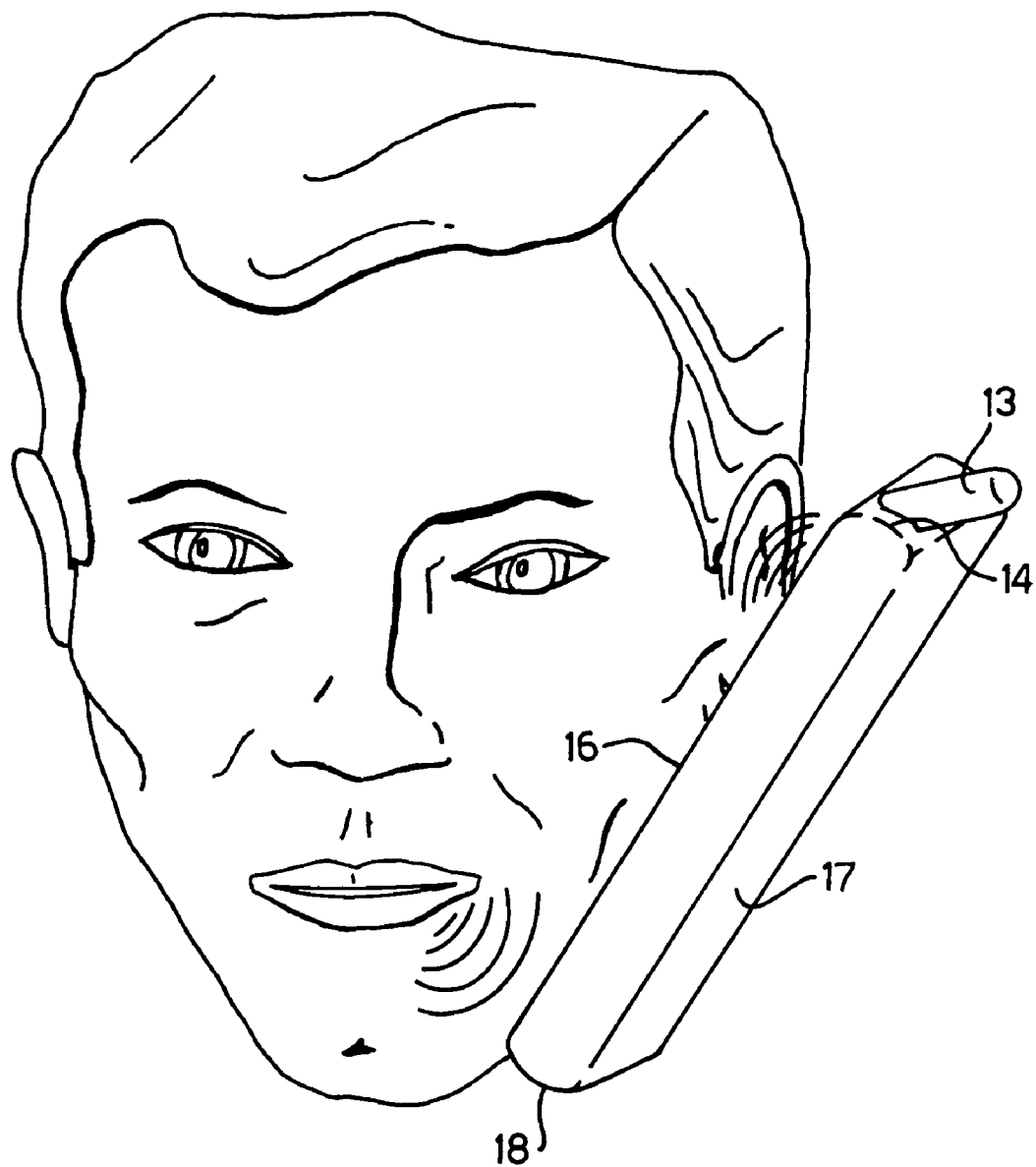
FIG. 4 is a view of a radio telephone in accordance with the invention in use, with the antenna pivoted to an angled position.

The main body portion 12 of the telephone comprises a generally rectangular housing having a front surface 16, a back surface 17, side surfaces 15, a bottom surface 18, and a top surface 14. The main body portion is generally elongate and accordingly defines a major axis, shown as A-A in FIG. 2. The telephone is designed to be brought into operating proximity with the head of a user as shown in FIG. 4 such that in general the front surface 16 faces the head of a user, the back surface 17 faces away from the head of the user, the bottom surface 18 faces downwards, and the top surface 14 faces upwards.

The main body portion 12 of the telephone 1 includes an earpiece 19 and a microphone 20 both situated on the front surface 16. The earpiece 19 and microphone 20 are positioned to cooperate respectively with the ear and mouth of a user as shown in FIG. 4.

The user interface of the telephone 1 further comprises a keypad including keys 21 for controlling the operation of the telephone, and a display 22 (e.g. an LCD display) for displaying information relevant to the operation of the telephone. Illuminating means (e.g. LED's) are provided to help a user see the keypad and display in bad light conditions. These illuminating means may be switched on or off depending on the operational state of the telephone.

The antenna 13 of the telephone 1 projects from the top surface 14 such that it extends beyond the housing of the main body portion 12. The antenna 13 is a helical antenna having a generally cylindrical shape with a rounded distal end. The antenna 13 defines a major axis about which the antenna is axially symmetric. The shape of the antenna may take other similarly symmetric forms such as a conical shape. These forms of antenna are often referred to to as stub antennas. In FIG. 2 the major axis of the antenna is substantially parallel with the major axis of the main body portion and is normal and perpendicular to the top surface.

Referring to FIG. 5*a* there is shown a side view of another telephone sharing the same features as the telephone in FIG. 2. The antenna 13 again projects from the top surface 14 such that it extends beyond the housing of the main body portion 12. In this embodiment the top surface is curved or rounded. As shown in FIG. 4*a*, the major axis of the antenna is substantially parallel with the major axis of the main body portion and is again normal to the top surface.

In accordance with the invention the antenna 13 of the telephone may be pivoted from the upright position shown in FIGS. 2 and 5*a*, to an angled or canted position as shown in FIGS. 3 and 5*b*.

As shown in FIGS. 2 and 3 the antenna 13 may pivot about an axis B-B such that the major axis of the antenna is substantially perpendicular to axis B-B throughout the rotation of the antenna. Accordingly, the antenna rotates only in a single plane. This single plane is parallel with the side surfaces, perpendicular to the top surface, and perpendicular to the front surface.

The pivotal rotation of the antenna is limited such that the antenna may only rotate through a small angle φ between the upright position and the angled position as indicated by arrow C in FIGS. 3 and 5*b*. In this way the antenna always projects from the top surface of the telephone.

When the antenna is in the canted position the angle subtended by the major axis of the main body portion and the major axis of the antenna equals φ. In the canted position the antenna is also directed or orientated away from front surface 16 as shown in FIGS. 3, 4, and 5*b*.

When the antenna is in the upright position and the telephone is brought into operating proximity with the head of a user, the radio frequency performance of the antenna is affected. This is due to the head of the user disturbing the radiation pattern normally produced by the antenna. By pivoting the antenna to the canted position while the telephone is in operating proximity with the head of a user, the antenna performance is improved. This is due to the antenna pivoting away from the head so that the head has less of a disturbing effect on the radiation pattern produced by the antenna.

Referring to FIGS. 6 to 9 there are shown four possible ways in which an antenna of a telephone in accordance with the present invention may be biased and/or locked as it pivots between the upright and canted positions. In each of the FIGS. 6 to 9 there are shown 3 views, namely a view of the antenna in the upright position, a view of the antenna in the partially canted position, and a view of the antenna in the fully canted position. Each arrow in the FIGS. 5 to 8 refers to the direction in which the antenna is biased. The biasing may be provided by, for example, a spring action.

Figure 6:
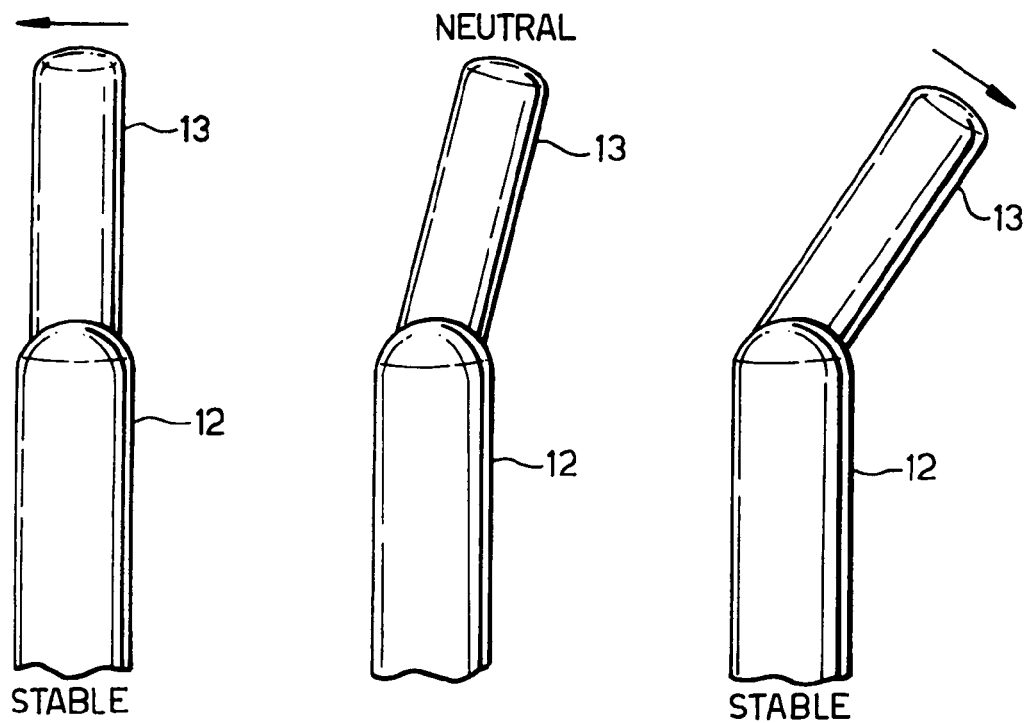
FIG. 6 is a series of three partial views of a radio telephone in accordance with the invention, showing the antenna in three different pivoted positions.

Referring specifically to FIG. 6, the antenna is neutrally biased in the partially canted position, and on either side of this position is biased towards the upright and fully canted positions. Accordingly, the antenna is stable in the upright and the fully canted positions.

Figure 7:
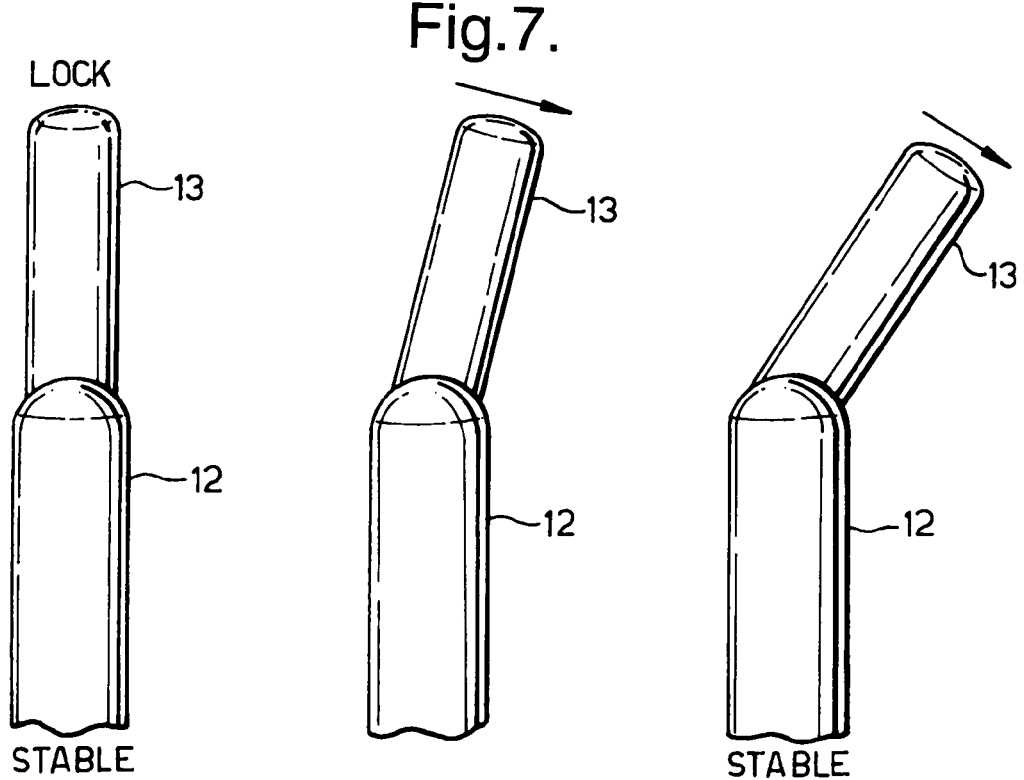
FIG. 7 is another series of three partial views of a radio telephone in accordance with the invention, showing the antenna in three different pivoted positions.

Referring specifically to FIG. 7, the antenna is releasably locked in the upright position, and once released is biased towards the fully canted position. Accordingly, the antenna is stable in the upright and the fully canted positions.

Figure 8:
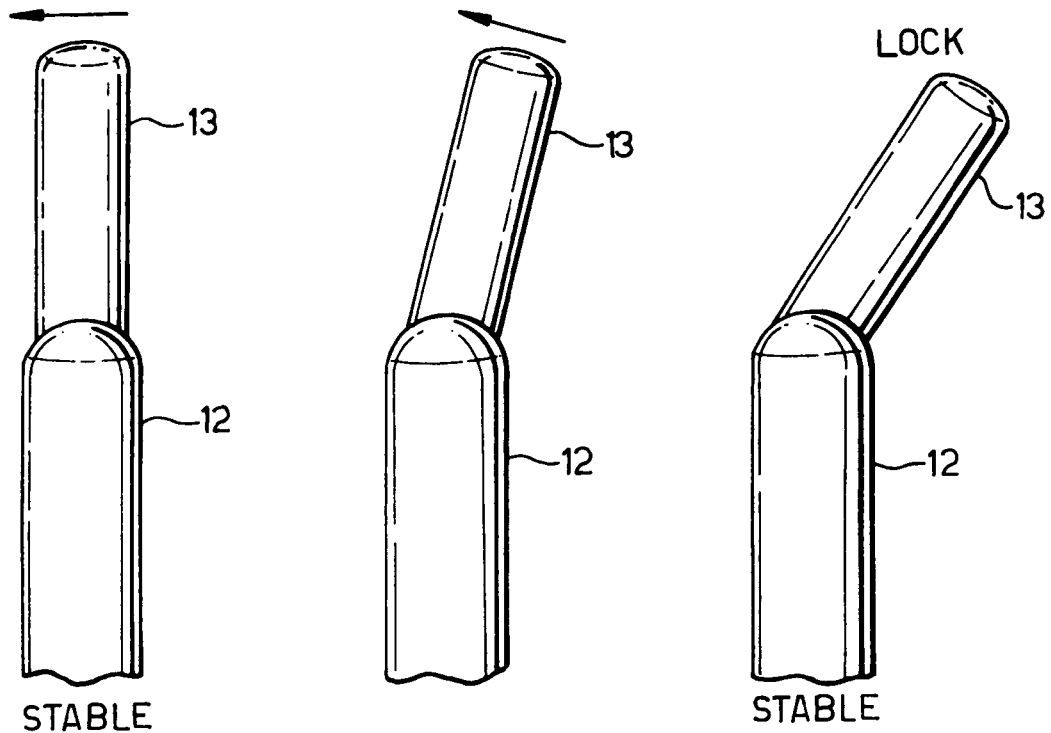
FIG. 8 is another series of three partial views of a radio telephone in accordance with the invention, showing the antenna in three different pivoted positions.

Referring specifically to FIG. 8, the antenna is releasably locked in the fully canted position, and once released is biased towards the upright position. Accordingly, the antenna is stable in the upright and the fully canted positions.

Figure 9:
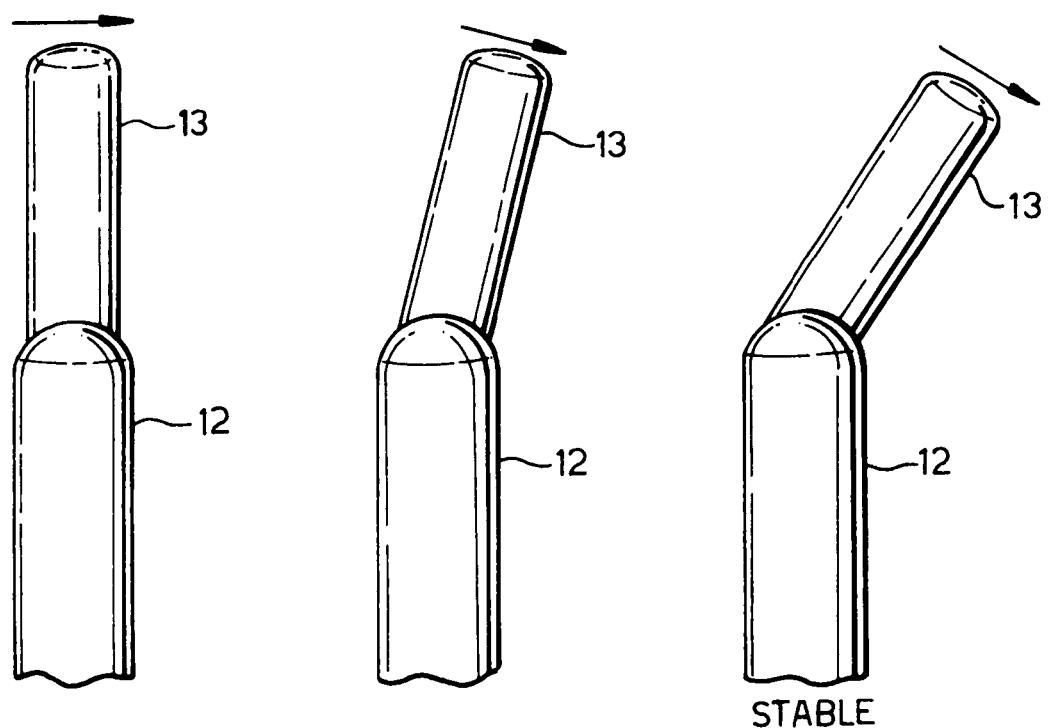
FIG. 9 is another series of three partial views of a radio telephone in accordance with the invention, showing the antenna in three different pivoted positions.

Referring specifically to FIG. 9, the antenna is always biased towards the fully canted position. Accordingly, the antenna is stable in the fully canted position.

Figure 10:
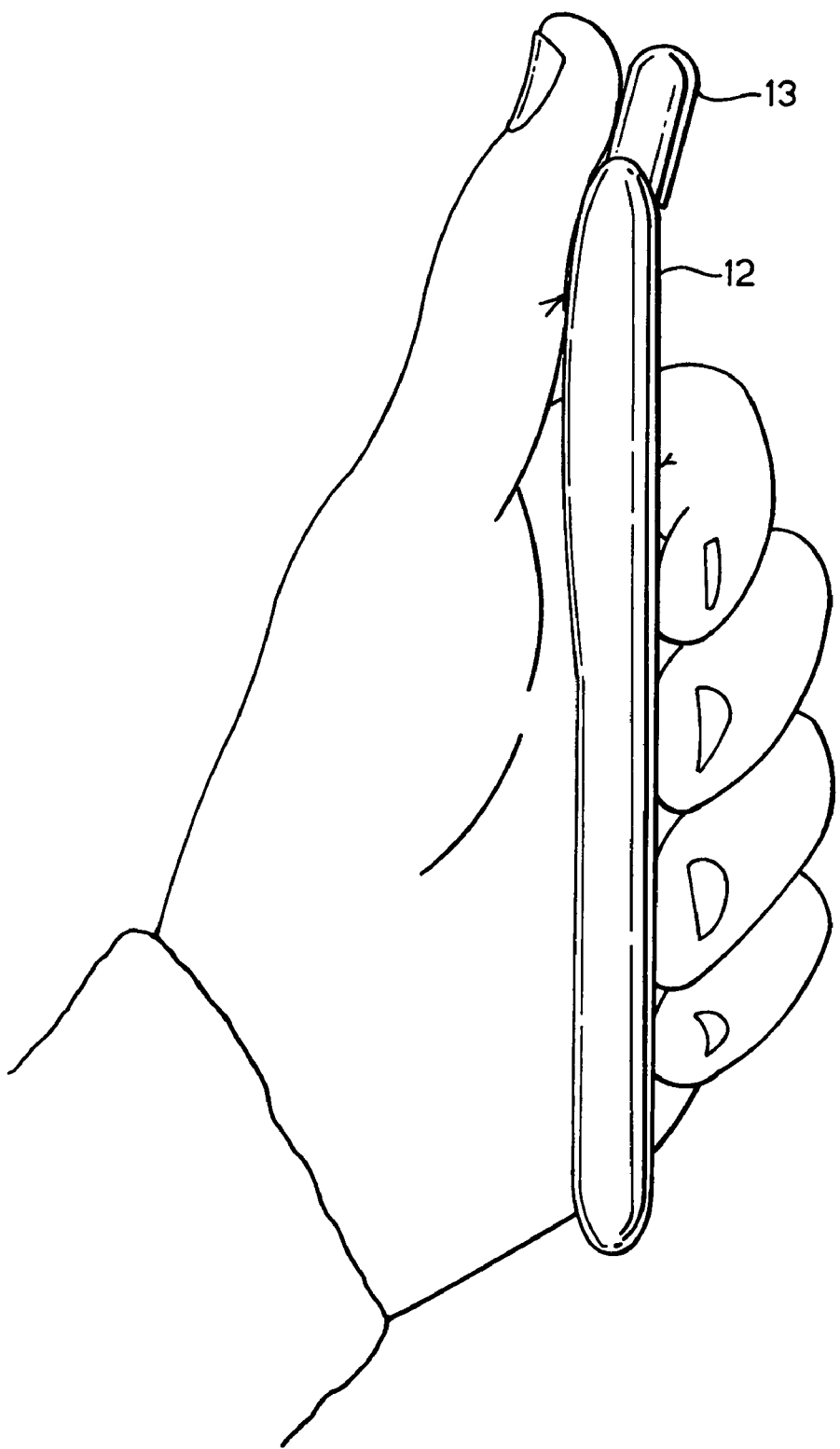
FIG. 10 is a view of the radio telephone of FIG. 4 which shows pivoting of the antenna by a thumb of a user.

Referring now to FIG. 10, there is shown the telephone of FIGS. 5*a* and 5*b* being operated by a hand of a user. With the fingers and palm of the hand gripping the main body portion 12, the thumb is free to pivot the antenna 13 from the upright position to the canted position. Thus the telephone allows one handed pivoting of the antenna to control the operation of the telephone. It is also possible to pivot the antenna with two hands.

When storing the telephone of FIG. 4*a* in a pocket, for example, it is desirable to have the antenna of the telephone in the upright position so that the profile of the telephone is minimised. Another instance when it is appropriate to have the antenna in the upright position is when placing the telephone on a flat surface. Sometimes, however, the antenna may be in the canted position when it is placed on a flat surface as shown in FIG. 11. In this situation the telephone is likely to experience a downward force on its front surface 16, as indicated by the arrow labelled F. An advantage of the telephone in this situation is that the antenna may adopt the upright position as a consequence of the force F pivoting the antenna relative to the main body portion. Accordingly, the telephone is likely to wobble on the surface and also the antenna is less liable to break or snap as a result of the force F.

FIGS. 12 and 13 are cross-sectional views of the telephone shown in FIGS. 2 and 3, showing a pivot arrangement for the antenna, and a switch responsive to pivotal movement of the antenna between the upright position and the canted position. The antenna 13 pivots about the pivot pin 25 only between the upright position shown in FIG. 12 and the angled position shown in FIG. 13. The pivotal rotation of the antenna is limited in this way by the stop pins 27 which abut the antenna to prevent further pivotal rotation at the extremes of the antenna's rotation. A switch 26 is provided in the housing of the main body portion 12 and is coupled to a microprocessor of the telephone to control the operation thereof. The switch 26 is actuated depending on whether a switch actuator 29 on the antenna 13 is in close proximity with the switch. In FIG. 12 the antenna is in the upright position and the switch actuator 29 is not in close proximity with the switch, therefore the switch is not actuated. However, when the antenna is pivoted to the angled position as in FIG. 13, the switch actuator 29 is in close proximity with the switch and the switch is actuated. The switch 26 may be a magnetic reed switch and the switch actuator 29 a magnet.

Figure 14:
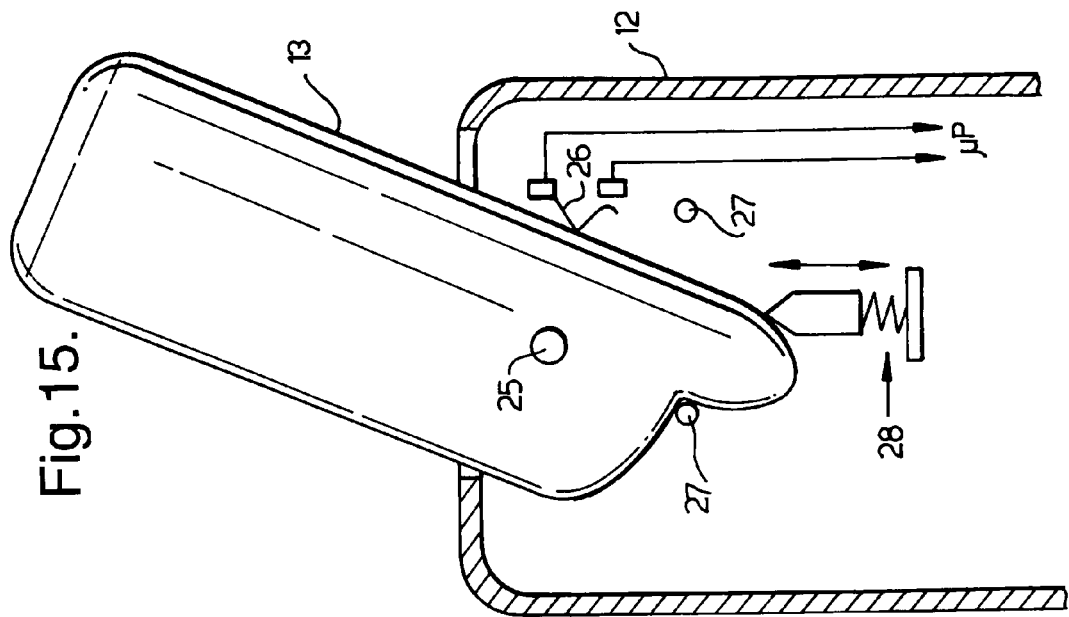
FIG. 14 is cross-sectional view of a portion of a radio telephone in accordance with the invention, with the antenna in the upright position.
Figure 15:
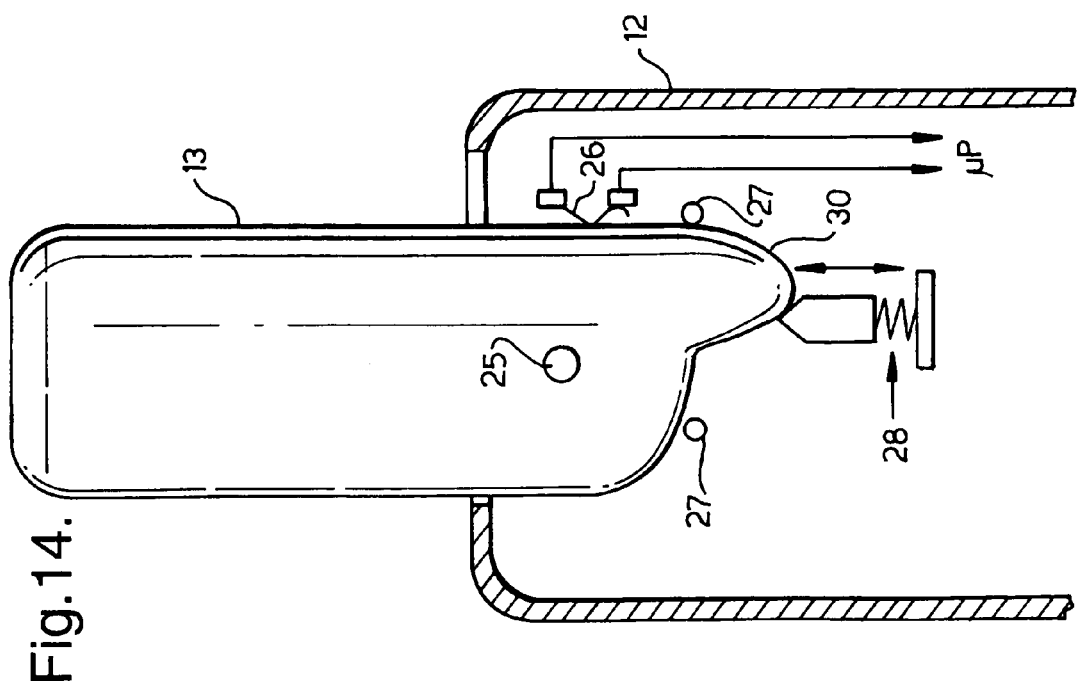
FIG. 15 is cross-sectional view of a portion of the radio telephone of FIG. 14, with the antenna pivoted to an angled position.

FIGS. 14 and 15 are cross-sectional views of the telephone shown in FIGS. 2 and 3, showing an alternative pivot arrangement for the antenna, and an alternative switch responsive to pivotal movement of the antenna between the upright position and the canted position. The antenna pivots in the same way as in FIGS. 12 and 13. However, the antenna 13 in this embodiment includes a camming surface 30 which abuts a sprung cam follower 28 in such a way as to produce the biasing action shown in FIG. 6. The switch 26 is actuated in this embodiment as a result of a surface of the antenna 13 urging the switch closed. In FIG. 14 the antenna is in the upright position and a surface of the antenna pushes the switch closed, therefore the switch is actuated. However, when the antenna is pivoted to the angled position, the surface of the antenna does not urge the switch closed and the switch is not actuated. The switch may be a leaf switch.

Figure 16:
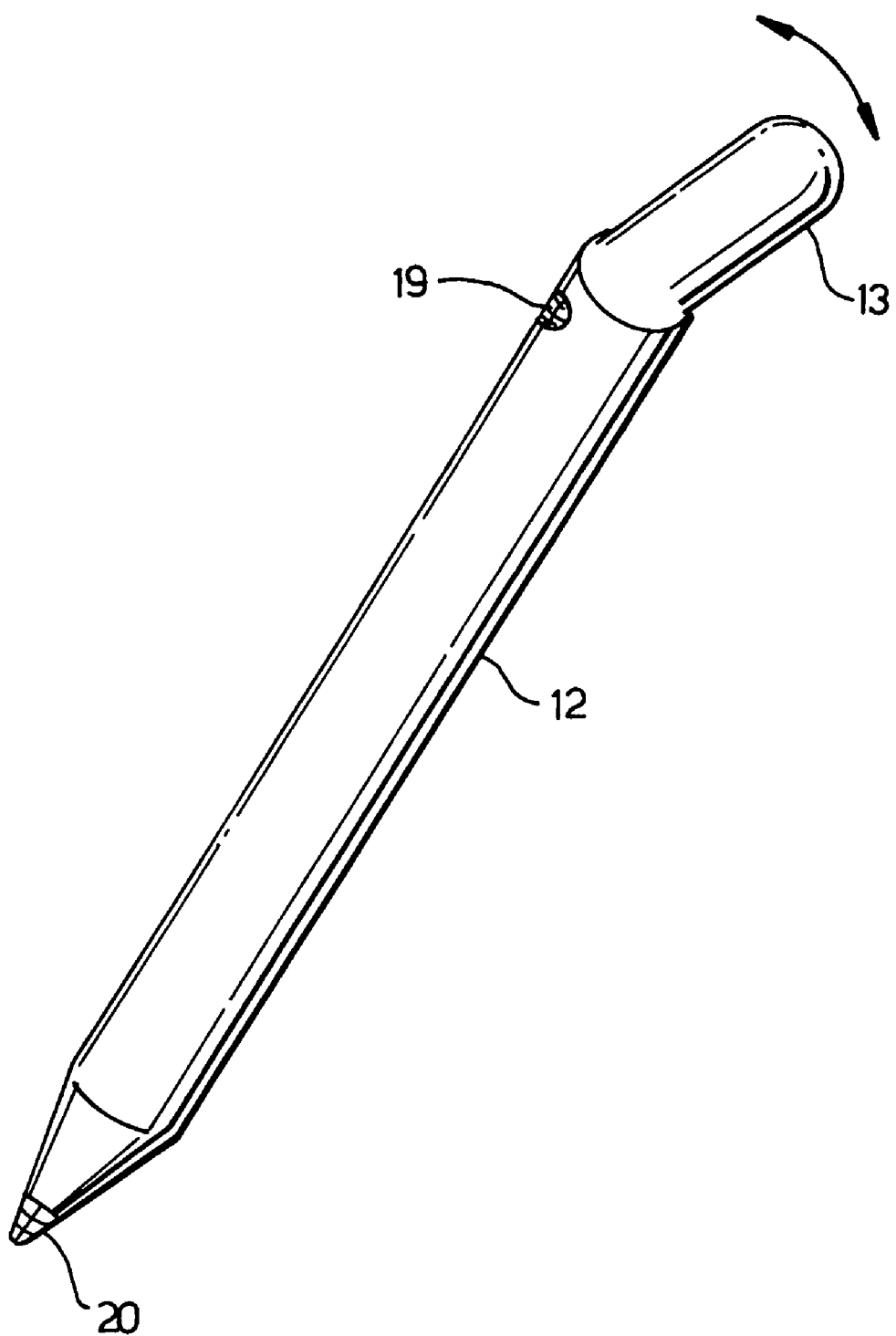
FIG. 16 is an perspective view of a telephone in accordance with the invention.

Another embodiment in accordance with the invention is shown in FIG. 16. In this embodiment the main body portion 12 is pen shaped and the antenna 13 extends beyond the housing of the main body portion. The main body portion also has a microphone 20 situated towards the bottom of the telephone and a loudspeaker 19 situated towards the top of the telephone.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What is claimed is:

1. An apparatus comprising:
a portable radio telephone;
an antenna with a pivot point positioned within the radio telephone, and
first and second stop pins positioned within the radio telephone,
wherein the antenna is arranged to pivot about the pivot point only at an acute angle in a single plane between a first position defined by the first stop pin in which the antenna projects from a top surface of the telephone, and a second position defined by the second stop pin in which the antenna projects from the top surface of the telephone, the antenna being biased and configured to be locked as the antenna pivots,
wherein the single plane is substantially perpendicular to a front surface of the radio telephone.

2. The apparatus of claim 1, further comprising a switch actuated by pivoting the antenna for controlling operation of the radio telephone.

3. The apparatus of claim 1, wherein the antenna is biased towards the first position.

4. The apparatus of claim 1, wherein the antenna is releasably locked in the first position.

5. The apparatus of claim 1, further comprising a switch for controlling operation of the radio telephone and an actuator on the antenna for actuating the switch.

6. The apparatus of claim 1, wherein the antenna is biased towards the second position.

7. The apparatus of claim 1, wherein the antenna is releasably locked in the second position.

8. The apparatus of claim 1, wherein in the first position the antenna projects substantially parallel with a major axis of the main body portion.

9. The apparatus of claim 1, wherein in the first position the antenna projects substantially perpendicular to the top surface of the main body portion.

10. The apparatus of claim 1, wherein the profile of the radio telephone is minimised when the antenna is in the first position.

11. The apparatus of claim 1 wherein in the second position the antenna is canted relative to a major axis of the main body portion.

12. The apparatus of claim 1, wherein the single plane of rotation intersects the top surface of the main body portion.

13. The apparatus of claim 1, wherein the antenna is a non-retracting helical antenna.

14. The apparatus of claim 1, wherein the main body portion includes an earpiece positioned near the antenna.

15. The apparatus of claim 1, wherein the main body portion includes a microphone positioned distant from the antenna.

16. The apparatus of claim 1, wherein the antenna extends beyond the main body portion.

17. The portable radio telephone of claim 1 wherein the antenna is releasably locked in the upright position, and once released is biased towards a fully canted position whereby the antenna is stable in the upright and the fully canted positions.

18. The portable radio telephone of claim 1 wherein the antenna is releasably locked in a fully canted position, and once released is biased towards the upright position whereby the antenna is stable in the upright and the fully canted positions.

19. The portable radio telephone of claim 1 wherein the antenna is always biased towards a fully canted position whereby the antenna is stable in the fully canted position.

20. An apparatus comprising:
a portable radio telephone; and
a non-retracting antenna configured for single handed operation, the antenna having a pivot point, a first stop pin, and a second stop pin positioned within the radio telephone, wherein the antenna pivots about the pivot point only at an acute angle in a single plane between a first position defined by the first stop pin in which the antenna projects from a top surface of the telephone and a second position defined by the second stop pin in which the antenna projects from the top surface of the telephone, the antenna being biased and adapted to be locked as the antenna pivots,
wherein the single plane is substantially perpendicular to a front surface of the radio telephone.

21. The apparatus of claim 20 wherein the antenna in the first position is stable and wherein the antenna is biased towards the first stable position.

22. The apparatus of claim 21 wherein the antenna in the second position is stable and wherein the antenna is biased towards the second stable position and wherein the antenna is releasably locked in the first stable position or the second stable position.

23. A portable radio telephone comprising an antenna with a pivot point and first and second stop pins internal to the telephone, wherein the antenna is arranged to pivot about the pivot point only at an acute angle in a single plane between a first position defined by the first stop pin in which the antenna projects from a top surface of the telephone, and a second position defined by the second stop pin in which the antenna projects from the top surface of the telephone, the antenna being biased and configured to be locked as the antenna pivots, wherein the single plane is substantially perpendicular to a front surface of the radio telephone.

24. The portable radio telephone of claim 23 further including stop members internally of the telephone for limiting the movement of the antenna through the acute angle.

25. The portable radio telephone of claim 23, further comprising a switch for controlling operation of the radio telephone and an actuator on the antenna for actuating the switch.

* * * * *

UNITED STATES PATENT AND TRADEMARK OFFICE
CERTIFICATE OF CORRECTION

| | | |
|---|---|---|
| PATENT NO. | : 7,706,847 B1 | Page 1 of 1 |
| APPLICATION NO. | : 09/074093 | |
| DATED | : April 27, 2010 | |
| INVENTOR(S) | : Robert Shaw Conway | |

It is certified that error appears in the above-identified patent and that said Letters Patent is hereby corrected as shown below:

Title page, item (75), delete "Arnold David Gocool," and insert -- Arnold Gocool, --, therefore Signed and Sealed this Twenty-fourth Day of August, 2010

David J. Kappos
*Director of the United States Patent and Trademark Office*